No. 610,156. Patented Aug. 30, 1898.
W. MECHWART & A. BRAHM.
WOODEN FLOWER TUB.
(Application filed Dec. 11, 1897.)

(No Model.)

Witnesses:
G. I. Noble
J. W. Dealy

Inventors
William Mechwart
Adam Brahm

By H. C. Hunsberger Att'y

United States Patent Office.

WILLIAM MECHWART AND ADAM BRAHM, OF CHICAGO, ILLINOIS.

WOODEN FLOWER-TUB.

SPECIFICATION forming part of Letters Patent No. 610,156, dated August 30, 1898.

Application filed December 11, 1897. Serial No. 661,548. (No model.)

*To all whom it may concern:*

Be it known that we, WILLIAM MECHWART and ADAM BRAHM, citizens of the United States, residing at Chicago, county of Cook, and State of Illinois, have invented a new and useful Improvement in Wooden Flower-Tubs, of which the following is a specification.

The objects of this invention are to provide a flower-pot that is susceptible of being divided into two or more parts for the purpose of more readily removing or transplanting the plants without damage to the root or foliage and to open the pot to expose the roots at any time for the purpose of treating them or to remove dead roots or to change the soil therein, all of which is difficult of accomplishment with the ordinary vessels now in use, particularly when the plants are large.

Our device is illustrated by the accompanying drawings, in which—

Figure 1:
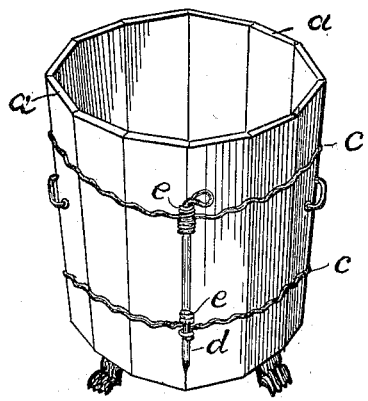
Figure 3:
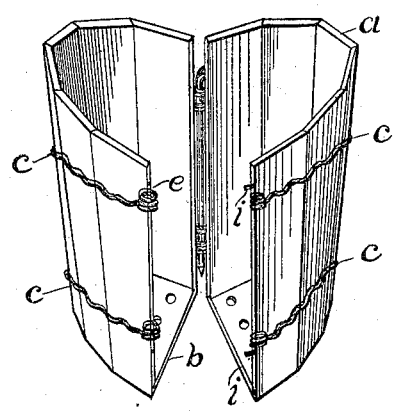
Figure 2:
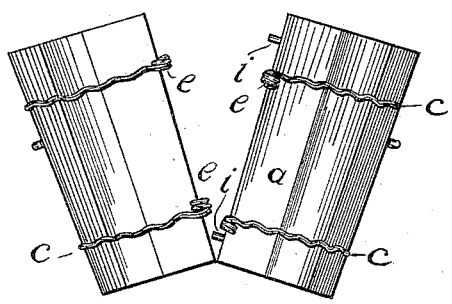
Figure 4:

Figure 1 is a perspective view of our device. Figs. 2 and 3 show how the flower-tub may be opened to expose the earth and roots. Fig. 4 shows a half-section of the wire hoop.

Similar letters refer to similar parts throughout the drawings.

Wooden staves $a\ a$, attached to the wooden bottom $b$ as in an ordinary pail or bucket and held together by means of wire hoops $c\ c$, give the form of our device.

The bottom $b$ is perforated and divided into two parts on a straight line drawn through its center, the staves being permanently attached to the bottom and fitted together by means of dowels. The pot is therefore susceptible of being divided into two equal parts.

The wire hoops $c\ c$ are crimped or sinuous in form and divided into two parts, each end terminating with a spiral coil $e$, these spiral coils meeting at the line of division of the parts of the flower-pot. These hoops are then locked together by means of long metal pins $d\ d$, which are inserted through the spiral ends of the hoops. The sides of the two parts of the flower-pot are provided with dowels $i\ i$ for the purpose of adding strength to the sides of the pot. The wire hoops are fixed in their places around the staves of the pot by means of a shallow groove and small staples, the crimped wire being used for the purpose of permitting the hoops to accommodate the expansion or swelling of the staves when saturated with moisture caused by watering the plants.

In opening the tub to receive or remove a plant both the pins $d\ d$ may be removed, when it opens as shown in Fig. 2, or if only one pin is removed it will swing open as in Fig. 3.

Having thus described our invention, what we claim as new, and desire to secure by Letters Patent, is—

1. In a wooden flower-tub adapted to be divided into two equal parts the combination of a perforated divisible base, wooden staves fitted to the base, the sides of the staves provided with dowels, sinuous wire hoops composed of two equal parts and placed on the tub to permit the ends to meet at a line drawn through the center of the tub, the ends of the parts of the hoops provided with spiral rings integral therewith, and means for locking the parts together as specified.

2. In a wooden flower-tub adapted to be divided into two parts, the combination of a divisible perforated bottom $b$ wooden staves $a, a$, dowels $i, i$, in the sides of the staves, sinuous wire hoops $c, c$, each composed of two equal parts, and a spiral ring $e$ on each end of the separated parts of the hoop and integral therewith, the rings $e, e$, adapted to be locked together at the line of division of the tub by means of the metal pins $d, d$, substantially as specified and shown.

WILLIAM MECHWART.
ADAM BRAHM.

Witnesses:
H. C. HUNSBERGER,
A. B. BATCHELDER.